Aug. 30, 1932. E. KEEN 1,874,193
APPARATUS FOR PROJECTING MOTION PICTURES
Filed Feb. 7, 1930
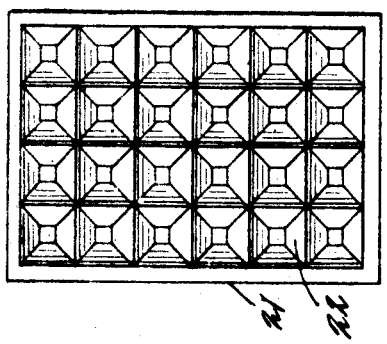
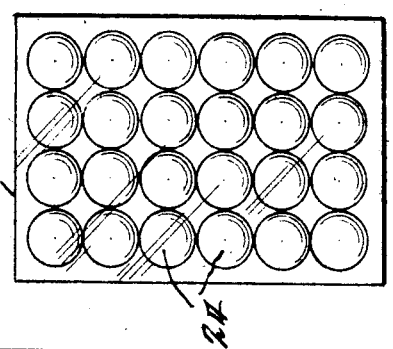
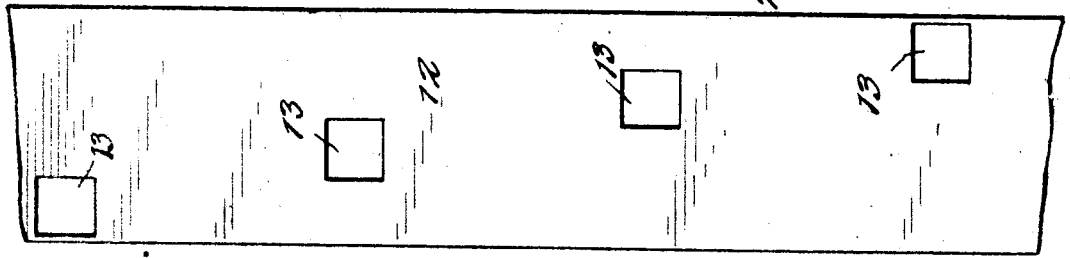
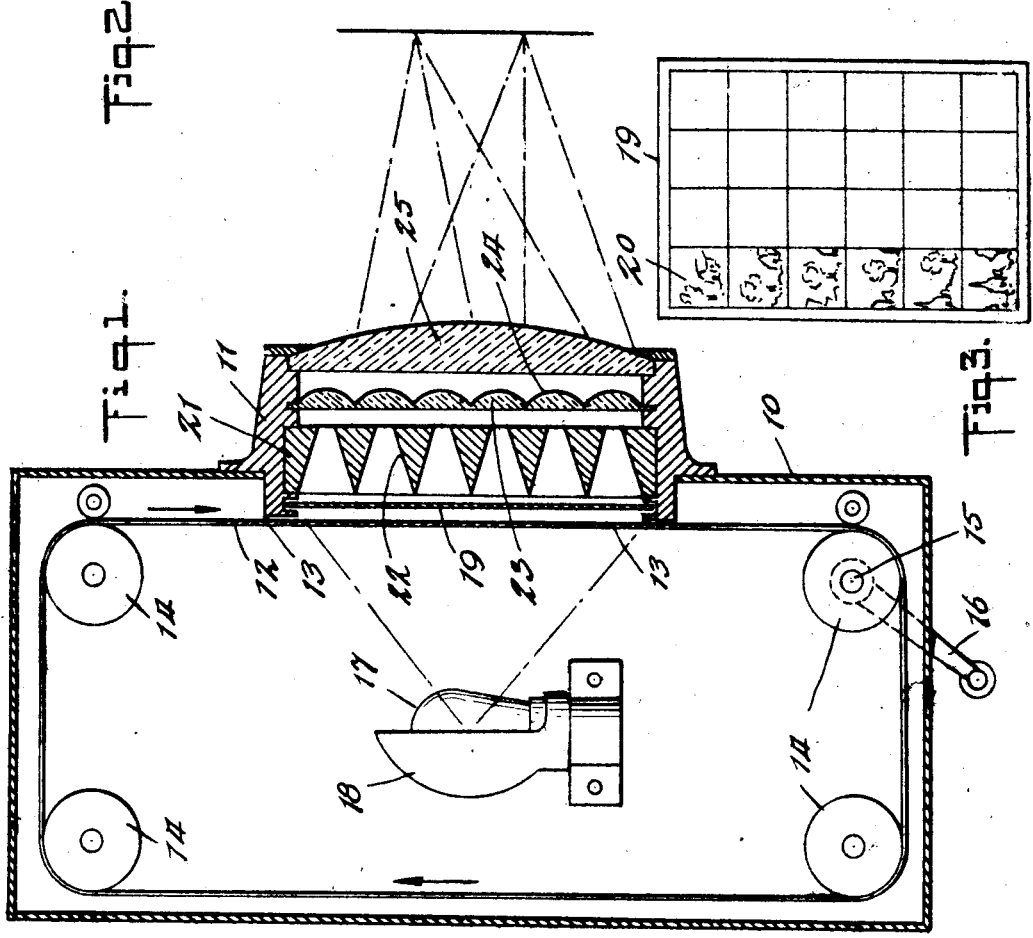
INVENTOR
Eliot Keen
BY Moses & Nolte
ATTORNEYS Patented Aug. 30, 1932

1,874,193

UNITED STATES PATENT OFFICE

ELIOT KEEN, OF JACKSON HEIGHTS, NEW YORK

APPARATUS FOR PROJECTING MOTION PICTURES

Application filed February 7, 1930. Serial No. 426,484.

This invention relates to new and useful improvements in motion picture apparatus and especially to motion picture projectors for simple, home, use and those which can be readily carried around from place to place.

A related invention is set forth in my copending application Serial Number 390,904, filed September 7, 1929, and entitled Apparatus for taking and projecting motion pictures. Subject matter shown and described but not claimed in this application is claimed in the former application.

A main object of this invention is to provide simple, and efficient means whereby the various images to be projected can be assured to fall on the same part of the screen so that an even uniform projection will be obtained without eye-straining flicker.

A further object is to produce the above mentioned results with as simple an addition to the former device as is possible without disturbing the present construction and arrangement and without undue additional expense.

Further and more specific objects, features, and advantages will more clearly appear from the detailed description given below when taken in connection with the accompanying drawing which form part of the specification and which illustrate one present preferred form of the invention.

The present preferred form of the invention illustrates the general principle of the herein described invention in that it shows a special and extra lens disposed to receive the several successive images from the various lenses of a cell block and so treat each one that they will all be directed to fall successively on the same area such as a screen and thus produce uniform, non-flickering pictures.

As represented in the drawing,

Figure 1 is a vertical longitudinal section through the improved device;

Figure 2 is a partial front elevation of the shutter employed;

Figure 3 is a front elevation of the film or picture negative employed;

Figure 4 is a front elevation of the light-guiding cellular block; and

Figure 5 is a front elevation of the cellular lens plate.

As shown in the drawing the invention relates to a motion picture projection apparatus comprising a casing or box 10 which contains therein a shutter 12 which may be an endless one, preferably of metal, and which casing has an opening in the front face thereof in which is disposed a lens head or block 11.

The shutter 12 is disposed to be moved across one face of the lens head 11 and closely adjacent preferably the rear face thereof. As shown in Fig. 2 the shutter 12 has a plurality of spaced apertures 13 therein. These apertures are disposed in separate longitudinal lines along the shutter and are also spaced preferably equal distances apart along their respective lines.

The shutter 12 passes over pulleys or rollers 14 and one of these preferably is driven by means of a handle or crank arm 16 disposed on a shaft 15, and in the direction shown. Within the casing 10 there is also disposed a lamp 17 backed by a suitable reflector 18 adapted to throw the light forward against the shutter 12.

Supported at the rear of the head 11 is a film or negative plate 19 which has thereon a plurality of preferably vertical rows of pictures 20 which are desirably successive views of a scene or moving action the successive views being disposed in the vertical rows. In front of the plate 19 there is disposed a cellular block of suitable material 21 which is divided up into a series of cellular chambers 22 having side walls shaped in a pyramidal manner and constricted in cross section as one looks forward therethrough. There is one of these chambers 22 in front of each of the picture sections 20 on the film of positive 19. The light passing through the positive sections is thereby guided to fall on the lens plate 23 and is confined to the particular lens 24 disposed before the particular picture section by means of the chambers 22. The action of each lens on the light beam is to form an image and project it forward but it is found that in order to have all the images projected by the lenses 24 fall on the same spot or area of the screen it is desirable to place another lens called a gathering lens 25 in front of the lens plate 23 and this gathering lens is so designed that no matter from what lens 24 the image is received it will be refracted to such an extent that it will fall on the same area as all the other images.

Preferably the lenses 24 are of the plano-convex type and the lens 25 of the plano-convex or double convex type. In the operation of the device as the shutter 12 moves downwardly across the plate 19 the series of apertures 13 therein successively expose the picture sections 20 in successive rows to the action of the light. These successive beams are passed through the lenses 22 and then to the lens 25 and all are designed to fall on the same part of the screen. The shutter is operated by the handle 16 at any suitable speed so that the effect of moving pictures is thus obtained.

The use of a metal shutter is of great importance since it serves to dissipate the heat from the light source 17 which otherwise might damage the film or even cause same to take fire. The endless form of the shutter is also of advantage since its speed always corresponds to that of the crank. In the usual construction where the shutter is wound upon a roller, this speed varies as the effective diameter of the roll varies upon which the shutter is wound.

It will be evident that the projector of my invention further possesses the advantage of being flickerless for the reason that the screen is continuously illuminated and the movement of the shutter is continuous. This enables the picture to be shown at any desired speed no matter how slow, and the shutter may be stopped for a period of seconds while the particular picture is viewed.

If desired, the shutter opening instead of being substantially equal in size to that of the individual picture may be larger than the picture, particularly twice the size thereof. The effect of this would be, first, to increase the illumination of the projected picture, and secondly, to produce a novel effect of blending of the pictures thrown upon the screen. Due to the converging lens employed, the images of both pictures will, of course, be substantially coincident.

While the invention has been described in detail and with respect to a present preferred form thereof, it is not to be limited to such forms or details since many changes and modifications may be made and the invention embodied in other forms and modifications without departing from the spirit or scope of the invention in its broadest aspects. Hence it is desired to cover any and all forms and modifications coming within the language or scope of any one or more of the appended claims.

I claim:

1. In combination with a stationary film containing a plurality of picture positives to be projected, a motion picture projector comprising a holder for the stationary film, a series of lenses each adapted to throw an image of an individual positive and occupying substantially the same position with reference to said positive as the original lens taking the picture occupied to the negative, whereby when the same or identical lens series is used for both taking and projecting the pictures, errors of alinement of the individual lenses are eliminated, a light source, a moving shutter between the light source and the film, adapted to successively expose said positives, and a single lens unit transmitting all of the images from the first mentioned lenses and directing them to a common area at a shorter distance from the projector than the image focusing points of said individual lenses.

2. In combination with a stationary film containing a plurality of picture positives to be projected, a motion picture projector comprising a holder for the stationary film, a series of lenses formed in a single plate of glass each adapted to throw an image of an individual positive, said lens plate occupying substantially the same position with reference to said film positive as the original lens taking the picture occupied to the negative, whereby when separate plates are used for both taking and projecting the pictures errors of alinement of the individual lenses are eliminated, a light source, a moving shutter between the light source and the film, adapted to successively expose said positives, and a single lens unit transmitting all of the images from the first mentioned lenses and directing them to a common area at a shorter distance from the projector than the image focusing points of said individual lenses.

3. In combination with a stationary film containing a plurality of picture positives to be projected, a motion picture projector comprising a holder for the stationary film, a series of lenses each adapted to throw an image of an individual positive and occupying substantially the same position with reference to said positive as the original lens taking the picture occupied to the negative, whereby when the same or identical lens series is used for both taking and projecting the pictures, errors of alinement of the individual lenses are eliminated, a light source, a moving metallic shutter between the light source and the film, adapted to protect said film from the heat of the light, and adapted to successively expose said positives, and a single lens unit transmitting all of the images from the first mentioned lenses and directing them to a common area at a shorter distance from the projector than the image focusing points of said individual lenses.

4. In combination with a stationary film containing a plurality of picture positives to be projected, a motion picture projector comprising a holder for the stationary film, a series of lenses each adapted to throw an image of an individual positive and occupying approximately the same position with reference to said positive as the original lens taking the picture occupied to the negative, a light source, a device adapted to successively expose said pictures in sequence, and a single lens unit transmitting all of the images from the first mentioned lenses and directing them to a common area at a shorter distance from the projector than the image focusing points of said individual lenses.

In testimony whereof I have affixed my signature to this specification.

ELIOT KEEN.